(12) United States Patent
Alhamoud et al.

(10) Patent No.: US 12,488,788 B2
(45) Date of Patent: Dec. 2, 2025

(54) METHOD AND COMPUTER READABLE STORAGE MEDIUM FOR AUTOMATED SPEECH RECOGNITION USING RETRIEVAL-BASED VOICE CONVERSION

(71) Applicant: ELM, Riyadh (SA)

(72) Inventors: Anas Alhamoud, Riyadh (SA); Muhammad Saleh Saeed Al-Qurishi, Riyadh (SA); Yasser Alomar, Riyadh (SA); Ali Alzahrani, Riyadh (SA); Riad Souissi, Riyadh (SA)

(73) Assignee: ELM, Riyadh (SA)

( * ) Notice: Subject to any disclaimer, the term of this patent is extended or adjusted under 35 U.S.C. 154(b) by 0 days.

(21) Appl. No.: 19/045,530

(22) Filed: Feb. 4, 2025

(65) Prior Publication Data

US 2025/0252950 A1 Aug. 7, 2025

Related U.S. Application Data

(60) Provisional application No. 63/549,828, filed on Feb. 5, 2024.

(51) Int. Cl.
*G10L 15/00* (2013.01)
*G10L 15/08* (2006.01)
(Continued)

(52) U.S. Cl.
CPC .............. *G10L 15/08* (2013.01); *G10L 15/22* (2013.01); *G10L 25/21* (2013.01); *G10L 13/02* (2013.01);
(Continued)

(58) Field of Classification Search
CPC ......... G10L 15/07; G10L 15/20; G10L 15/22; G10L 15/26; G10L 15/30; G10L 15/02;
(Continued)

(56) References Cited

U.S. PATENT DOCUMENTS 11,335,324 B2 * 5/2022 Biadsy .................... G10L 13/08
11,410,642 B2 * 8/2022 Scuderi ................... G10L 15/04
(Continued)

FOREIGN PATENT DOCUMENTS

CN 116453502 A 7/2023

OTHER PUBLICATIONS

Kacper Radzikowski, et al., "Accent modification for speech recognition of non-native speakers using neural style transfer", EURASIP Journal on Audio, Speech, and Music Processing, No. 11 (2021), Feb. 18, 2021, 10 pages.

*Primary Examiner* — Vu B Hang
(74) *Attorney, Agent, or Firm* — Oblon, McClelland, Maier & Neustadt, L.L.P.

(57) ABSTRACT

A computer-implemented method of generating speech from a source voice of a speaker in a language for a speech device connected to the computer, where the speech device language is a non-native language of the speaker. The method includes inputting speech in the source voice, encoding the speech in the source voice into a content vector, retrieving top k similar content vectors from a vector representation database that substantially match phonetic patterns of the encoded source voice, generating a new voice waveform based on the similar content vectors that contains linguistic content of the source voice, but with the phonetic patterns of a native speaker's voice of the speech device language, and outputting the new voice waveform.

20 Claims, 9 Drawing Sheets

(51) Int. Cl.
*G10L 15/22* (2006.01)
*G10L 25/21* (2013.01)
G10L 13/02 (2013.01)
G10L 13/06 (2013.01)
G10L 13/08 (2013.01)
G10L 13/10 (2013.01)

(52) U.S. Cl.
CPC .............. *G10L 13/06* (2013.01); *G10L 13/08* (2013.01); *G10L 13/10* (2013.01)

(58) Field of Classification Search
CPC ....... G10L 15/063; G10L 25/78; G10L 25/87; G10L 21/0208; G10L 15/08; G10L 13/00; G10L 13/04; G10L 13/06; G10L 13/07; G10L 13/08; G10L 21/003; G10L 25/75; G10L 13/02; G10L 13/033; G10L 13/10; G10L 19/02; G10L 19/00; G10L 15/187; G10L 2015/0631; G10L 15/1822; G10L 15/183; G10L 15/19; G10L 15/193; G10L 25/00
See application file for complete search history.

(56) References Cited

U.S. PATENT DOCUMENTS

| | | | |
|---|---|---|---|
| 11,580,952 B2 * | 2/2023 | Zhang | G10L 13/08 |
| 12,260,851 B2 * | 3/2025 | Finkelstein | G10L 13/047 |
| 2023/0335107 A1 | 10/2023 | Zhao et al. | |

* cited by examiner

FIG. 7

METHOD AND COMPUTER READABLE STORAGE MEDIUM FOR AUTOMATED SPEECH RECOGNITION USING RETRIEVAL-BASED VOICE CONVERSION

CROSS-REFERENCE TO RELATED APPLICATIONS

This application claims the benefit of priority to provisional application No. 63/549,828 filed Feb. 5, 2024, the entire contents of which are incorporated herein by reference.

BACKGROUND

Technical Field

The present disclosure is directed to an apparatus and a method for automatic speech recognition for non-native speakers. The apparatus and a method may include converting the speech into an equivalent native speaker's voice before transcription.

Description of Related Art

The advent of Automatic Speech Recognition (ASR) technology has revolutionized how humans interact with machines. Automatic Speech Recognition technology is capable of converting spoken language (an audio signal) into written text. The written text may be a command. From dictating texts to controlling smart home devices, ASR systems have become integral to our daily lives. However, despite their widespread use, these systems face significant challenges in accurately recognizing and transcribing speech from non-native language speakers. This discrepancy not only affects the efficiency of technological interaction but also raises concerns about accessibility and inclusivity. Previous research has highlighted the profound impact of accent variation on ASR performance, yet solutions to this issue have been limited and often not universally applicable.

To address these challenges, one object of the present disclosure is an ASR method and system that can accommodate phonetic and prosodic variations presented by non-native accents. In one aspect the system and method are capable of reduced word error rates (WER) in transcription of speech in non-native accents.

SUMMARY

An aspect of the present disclosure is a method of generating speech from a source voice of a speaker in a language for a speech device connected to the computer, where the speech device language is a non-native language of the speaker, comprising: inputting, via the speech device, speech in the source voice; encoding, by a phoneme encoder of the computer, the speech in the source voice into a content vector; retrieving top k similar content vectors from a vector representation database that substantially match phonetic patterns of the encoded source voice; generating, using a Mel-Spectrogram Generative Model of the computer, a new voice waveform based on the similar content vectors that contains linguistic content of the source voice, but with the phonetic patterns of a native speaker's voice of the speech device language; and outputting the new voice waveform.

A further aspect of the present disclosure is a non-transitory computer-readable storage medium including computer executable instructions, wherein the instructions, when executed by a computer, cause the computer to perform a method for generating speech from a source voice of a speaker in a language for a speech device connected to the computer, where the speech device language is a non-native language of the speaker, the method comprising: receiving, via the speech device, speech in the source voice; encoding, by a phoneme encoder, the speech in the source voice into a content vector; retrieving top k similar content vectors from a vector representation database that substantially match phonetic patterns of the encoded source voice; generating, using a Mel-Spectrogram Generative Model, a new voice waveform based on the similar content vectors that contains linguistic content of the source voice, but with the phonetic patterns of a native speaker's voice of the speech device language; and outputting the new voice waveform.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

The present disclosure relates to a system that addresses a critical gap between ASR for native speakers and ASR for non-native speakers of a target language. An aspect is an approach that converts non-native speech into a native speaker's voice before transcription. An aspect is an approach that utilizes a Speech Accent Archive alongside an ASR engine and utilizes a retrieval-based voice conversion (RVC) technique that is based on a vector representation of speech.

An aspect is a method that transforms non-native speech into a native equivalent. An aspect is a method that utilizes a phoneme encoder to ensure the linguistic content is maintained while altering the acoustic properties to match native pronunciation. An aspect is automatic detection of the language of an input speech. An aspect is a method that uses a Mel-spectrogram generative model, trained on native speech, to generate a converted voice that is closely aligned with native pronunciation and intonation. An aspect is an improvement in accuracy in recognizing speech of non-Native speakers by providing an ASR engine with native-equivalent speech. An aspect is an extension to multiple languages through creation of separate vector databases and generative models for each language. An aspect is application to assisting persons learning a language to improve their pronunciation by providing feedback based on native speech patterns. An aspect is ASR for various contexts where transcription is performed for non-native language speakers, including, but not limited to employees of multinational corporations, customer queries, transcribing patient information, transcribing interviews, generating subtitles, to name a few.

It has been determined that conventional ASR systems are more attuned to native speech patterns. For example, an conventional ASR system for recognizing English speech performs best for native English speech. One approach to mitigate recognition errors may be to align non-native utterances to native speech patterns. However, although there is a slight improvement by this approach, it has been found that the word error rate (WER) remains high. The present method improves this possible approach by converting non-native speech into a native speaker's voice waveform before speech recognition by the ASR engine. The present method significantly reduces WER, thus enhancing the accuracy and reliability of conventional ASR engines. The improved approach utilizes a Speech Accent Database phoneme and utilizes a Retrieval-based voice conversion (RVC) technique.

In particular, converting a non-native speaker's voice into a native speaker's voice not only improves ASR performance but also enhances overall transcription accuracy, a feature that has not been explored in depth in prior voice conversion technologies. The present system leverages phoneme conversion, which helps non-native speakers produce sounds that may not exist in their native language, thus mitigating accent-related issues in ASR systems.

The present system employs RVC for voice adaptation and integrates it into a specialized pipeline designed to improve ASR accuracy, particularly for speakers with strong accents or non-native speech patterns. This approach not only improves WER but also addresses inclusivity in ASR systems, making them more applicable to a diverse user base.

This integration into the specialized pipeline is further optimized using an advanced segmentation system and machine learning models. The system and models are tailored to handle the intricacies of multi-accent and multi-language environments. The system involves application of voice conversion specifically to improve speech recognition, and not just for voice cloning.

For purposes of this disclosure, a non-native speaker is a person whose knowledge and use of a language is characterized by the fact that it is not their first or native language. Often a non-native speaker is a person that lives in a region or a country where one or more native languages are spoken, but can speak in a different language than the native languages. In such case, the non-native language is the language that is different from the native language. In some cases, a non-native speaker is a person that was taught one or more native languages as a child, then learns to speak a different language at a later age, as a second language. The non-native language speaking person will substantially speak the one or more native languages characterized by phonetic and prosodic variations presented by non-native accents.

An exemplary aspect is a case where the target language is English and the non-native language is a language other than English. The non-native speaking person may also be a person that has family members or is a member of a community where the spoken language is generally other than English. In such case, the spoken English language by the non-native English language speaker will have some degree of phonetic and prosodic variations presented by non-native accents.

Figure 1A:
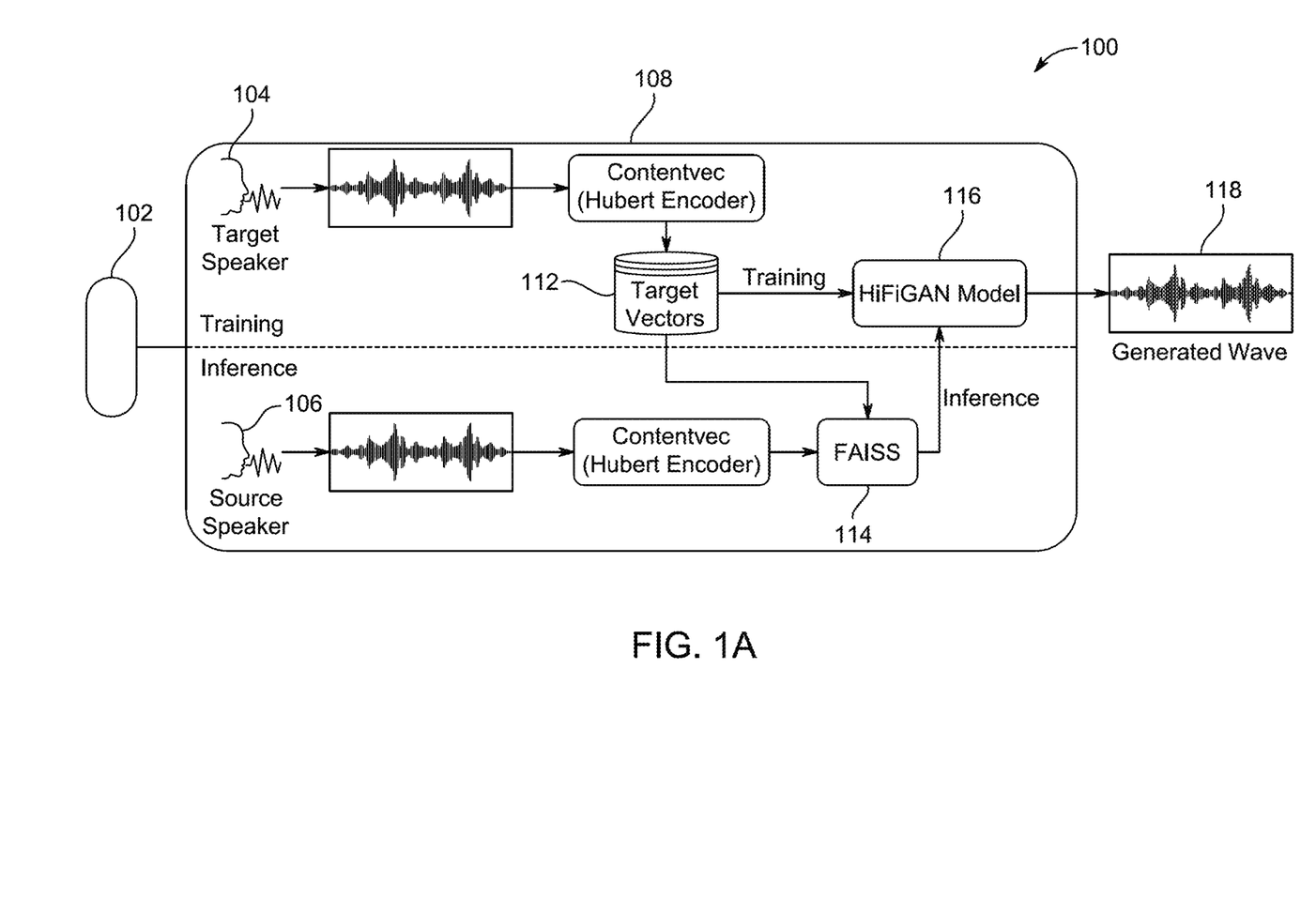
FIG. 1A illustrates a system architecture, in accordance with an exemplary aspect of the disclosure.
Figure 1B:
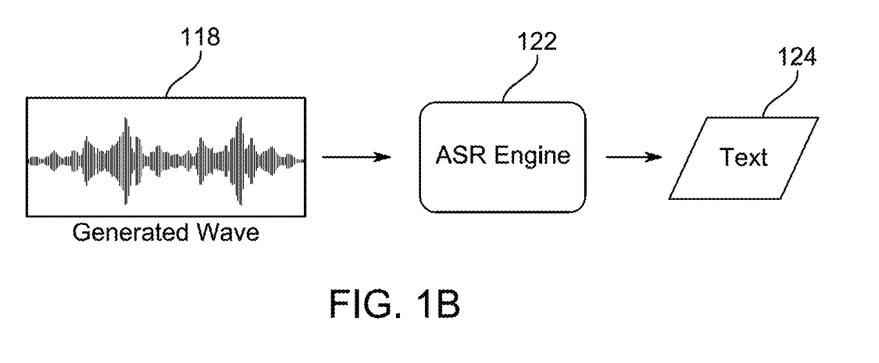
FIG. 1B illustrates an automatic speech recognition downstream component of the system architecture, in accordance with an exemplary aspect of the disclosure.

FIG. 1A illustrates an architecture for generating a speech pattern based on speech by a non-native speaker. FIG. 1B is a downstream model for converting the generated speech pattern into text. The system architecture 100 is for improving ASR in FIG. 1B through Retrieval-Based Voice Conversion. The system architecture 100 involves processing audio inputs, either read from a file or input via a microphone 102, from both target 104 (native language speaker, such as an English language speaker in a country whose primary language is English) and source 106 (non-native language speaker, such as a speaker whose native language is different from the non-native language) through a ContentVec encoder 108 to extract content vectors. These vectors from the target speaker are stored in a database of target vectors 112.

In an embodiment, a HuBERT encoder is used for the ContentVec encoder 108. The Hidden-Unit BERT (HuBERT) is an approach for self-supervised speech representation learning, which utilizes an offline clustering step to provide aligned target labels for a BERT-like prediction loss. An implementation of HuBERT includes a convolutional waveform encoder, a BERT encoder, a projection layer and a code embedding layer. HuBERT can be configured in various sizes including Base, Large, X-Large. In an exemplary embodiment, the Base HuBERT encoder is used in the voice conversion pipeline.

The HiFi-GAN model 116 is trained on these target vectors. The HiFi-GAN model 116 is used to convert the source's voice characteristics to match the target. HiFi-GAN is a generative adversarial network for high fidelity speech synthesis. HiFi-GAN generates waveforms corresponding to input vectors. The model has demonstrated similarity to human quality while generating high-fidelity audio. HiFi-GAN consists of one generator and two discriminators: multi-scale and multi-period discriminators. The generator and discriminators are trained adversarial, along with two additional losses for improving training stability and model performance.

During inference, the system architecture 100 uses a combination of target vectors and source vectors. Specifically, the system architecture 100 employs an index search to retrieve the closest matching target vectors from the database of target vectors 112 utilizing FAISS 114 (Facebook AI Similarity Search) from the trained set of native English speakers. FAISS is a library of efficient and scalable similarity search algorithms. These closest matching vectors are then weighted according to their match score and combined with the source audio's content vectors. The combined features are processed through the HiFi-GAN model 116 to generate the output converted waveform 118 that maintains the linguistic content of the source 106 while adopting the voice characteristics of the target 104.

FIG. 1B is a block diagram of downstream voice conversion. In the downstream voice conversion, the generated waveform 118 is converted by an ASR engine 122 into text 124. In this disclosure, six versions of an ASR engine have been evaluated. The six versions of the ASR engine 122 are used to assess transcription accuracy. The assessment involves transcribing both the original and converted speech samples using the six versions of the ASR engine.

Among the versions of the ASR engine 122, six versions of the Whisper ASR engine were considered—Tiny, Base, Small, Medium, Large, and Large-v2—with each version offering different trade-offs in terms of accuracy. In a preferred embodiment, the Whisper Large-v2 model showed the most significant improvement. The implementation used to perform training and inference included hardware with GPU's, as well as training parameters including 300 epochs, batch size 32, learning rate 1.00E-04, sampling rate 16000, filter length 2048, hop length 480, and window length 2048. The Whisper Large-v2 version has 32 layers, a hidden state dimension of 1280, and 20 attention heads. In contrast, Whisper Tiny version has hidden state dimension of 384, Base version has hidden state dimension of 512, Small version has hidden state dimension of 768, Medium version has hidden state dimension of 1024, Large version has hidden state dimension of 1280, with 1.55 billion weight parameters.

Figure 2A:
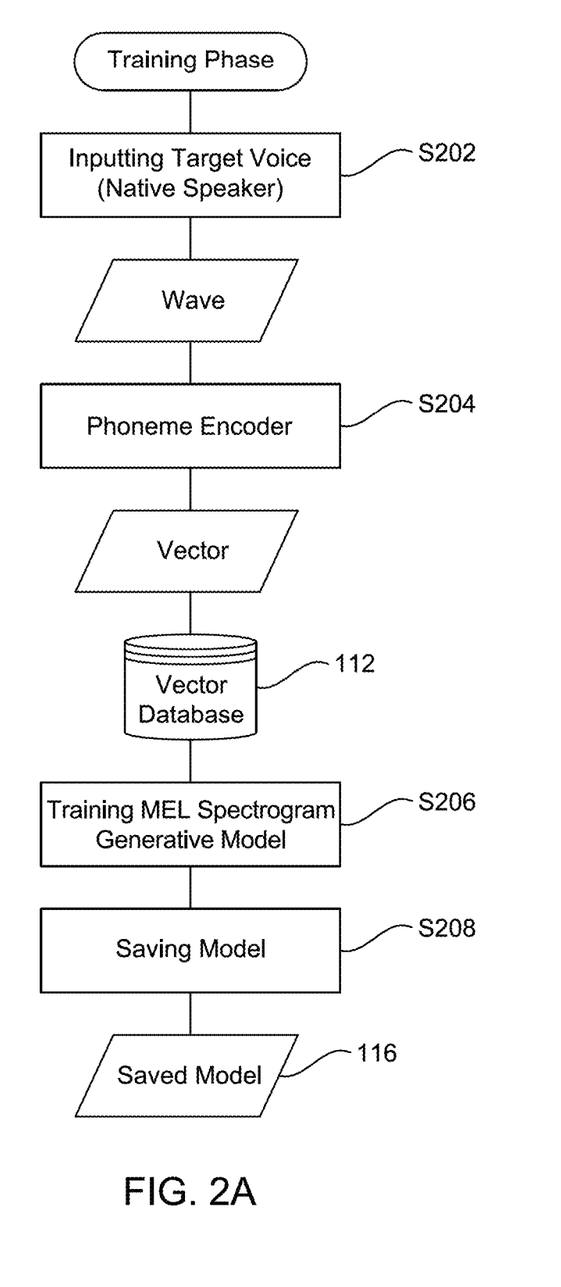
FIG. 2A is a flowchart of the training phase, in accordance with an exemplary aspect of the disclosure.
Figure 2B:
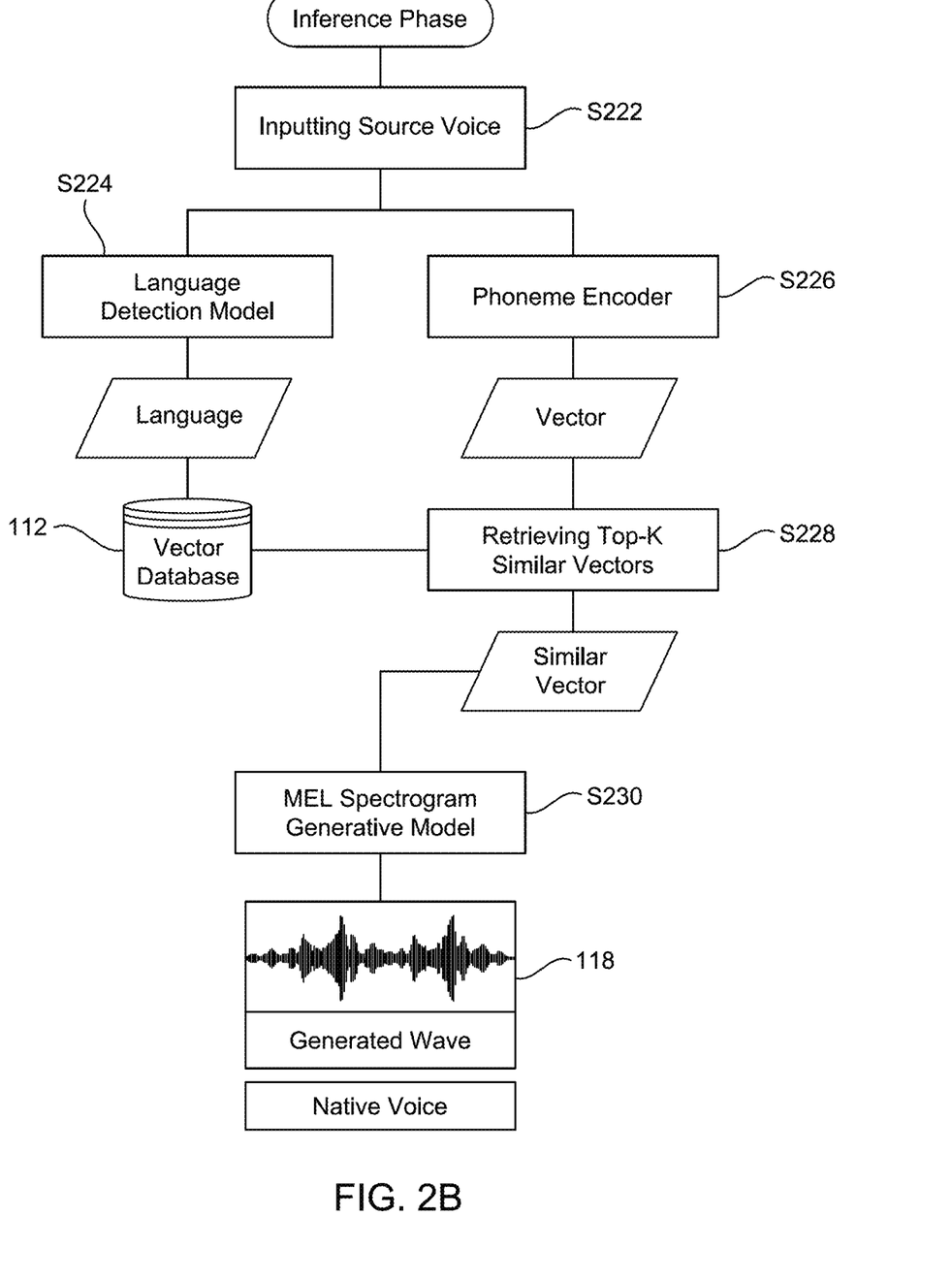
FIG. 2B is a flowchart of the inference phase, in accordance with an exemplary aspect of the disclosure.

FIG. 2A is a flowchart of the training phase for training the HiFi-GAN model. FIG. 2B is a flowchart of the inference phase using the trained HiFi-GAN model. The steps in the two flowcharts follow the flow in FIG. 1A for converting speech patterns from a source speaker who's primary language is a non-native language to into speech that is as if the source speaker is akin to the native language.

In the training phase of FIG. 2A, in S202, a collection of voice samples from native speakers 104 of a target language (Language X) is gathered. These voice samples are in the form of audio waveforms.

In step S204, a phoneme encoder (ContentVec 108) processes the audio waveforms to extract the phonetic components and converts them into a series of target vectors, capturing the unique characteristics of the native speech.

These vectors are then stored in a Vector Representation Database 112, which is specifically tailored for Language X.

In step S206, a Mel-Spectrogram Generative Model 116 is trained using the target vectors from the database 112, enabling it to generate Mel-spectrogram representations of speech that closely mimic the acoustic properties of native speech in Language X.

After training, in S208, the trained generative model 116 is saved for future use in converting non-native speech during the inference phase.

Referring to FIG. 2B, in the inference phase, in step S222, the system receives an audio input (Source Voice 106) from a non-native speaker.

In S224, a Language Detection Model identifies the language spoken in the source voice as Language X.

In S226, the source voice is processed through the same phoneme encoder (ContentVec 108) used during training to convert the speech into vector form.

In S228, the system retrieves the top-k similar vectors from the Vector Representation Database that match the phonetic patterns of the encoded source voice.

In S230, using the Mel-Spectrogram Generative Model, the system generates a new voice waveform 118 that contains the linguistic content of the source voice but with the phonetic characteristics of a native speaker's voice in Language X.

Referring back to FIG. 1B, this generated native-like voice waveform 118 can serve as an input into an Automatic Speech Recognition (ASR) engine 122.

The ASR engine 122 transcribes the generated voice into text 124, as a generated transcription.

The disclosed method achieves a significant reduction in Word Error Rates (WER) when applied to non-native English accents and when grouped by country. The ASR engine xLarge model exhibited the most substantial performance, with an average reduction in WER of 9.4% when grouping by country and 6.4% by accent. Notably, the maximum reduction in WER reached 72.5% for xLarge by country and 59.4% for both Large and xLarge by accent, showcasing the model's robustness. Across all models, the improvements affirm the potential of voice conversion technology to enhance ASR systems' inclusivity for a diverse range of speakers.

In an embodiment, for the training of the voice conversion model HiFi-GAN 116, the Crepe pitch extraction algorithm is utilized to preprocess the audio data. The Crepe algorithm is a pitch estimation algorithm that estimates the fundamental frequency (FO) from audio waveforms. The voice conversion model 116 is trained over a few hundred epochs using a dataset comprising 30 minutes of the target speaker's voice. This training aims to train the HiFi-GAN model 116 to accurately generate waveforms from content representations derived from the target speaker's voice features using ContentVec 108.

In the embodiment, during inference, the source speaker's audio is similarly processed using the Crepe algorithm. The audio is encoded using ContentVec 108 to match the learned content representations. FAISS 114 is then employed for vector search, retrieving the nearest vector from the target's database. The matched vector representation is subsequently fed into the HiFiGAN model 116, which generates the converted audio waveform. The sample rate for both training and inference phases is set at 16000 Hz to ensure consistency and high-quality audio output. Values used for the training parameters are provided in Table I

TABLE 1

The paramters being adopted for training

| Parameter | Value |
| --- | --- |
| GPU | 2 × 3090 |
| Epochs | 300 |
| Batch size | 32 |
| Seed | 1234 |
| Learning rate | 1.00E−04 |
| Sampling rate | 16000 |
| Filter length | 2048 |
| Hop length | 480 |
| Win length | 2048 |
| Number of mel channels | 128 |
| Number of Accent | 199 |
| Number of Countries | 176 |

Two advanced voice conversion techniques were compared against the combined Automatic Speech Recognition and Retrieval-based Voice Conversion (ASR-RVC) model.

First, Vector Quantization and Mutual Information-Based Unsupervised Speech Representation Disentanglement for One-shot Voice Conversion (VQMIVC), an unsupervised method that employs Vector Quantization and Mutual Information was configured to disentangle and manipulate components of speech for voice conversion. Second, a Diffusion-Based Any-to-Any Voice Conversion (DiffCV) model was configured to combine a one-shot many-to-many conversion approach with an average voice encoder and a diffusion-based decoder, employing a Stochastic Differential Equations solver and maximum likelihood sampling for superior performance. The method and system of the present disclosure are capable of quantifying the improvement in transcription accuracy when applying voice conversion, and analyzing how this improvement varies across different countries and accents.

Figure 3A:
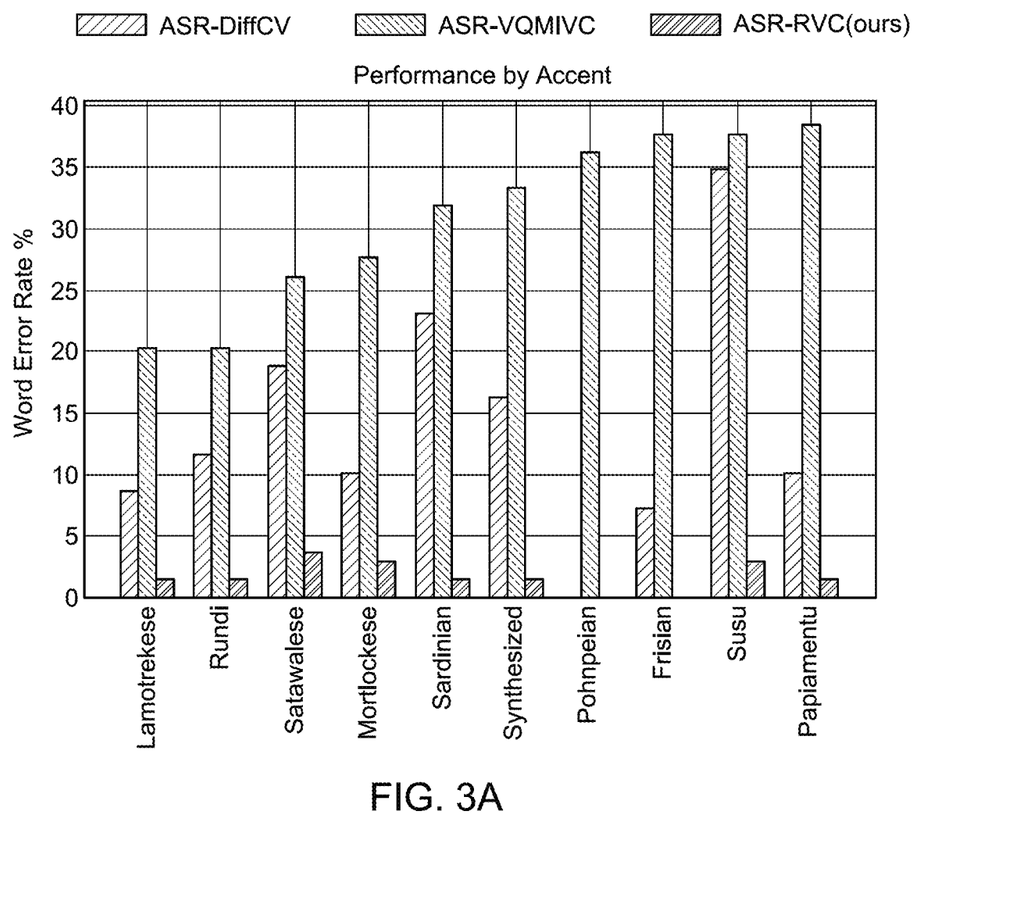
FIG. 3A is a chart for a comparative analysis of the ASR performance by accent.
Figure 3B:
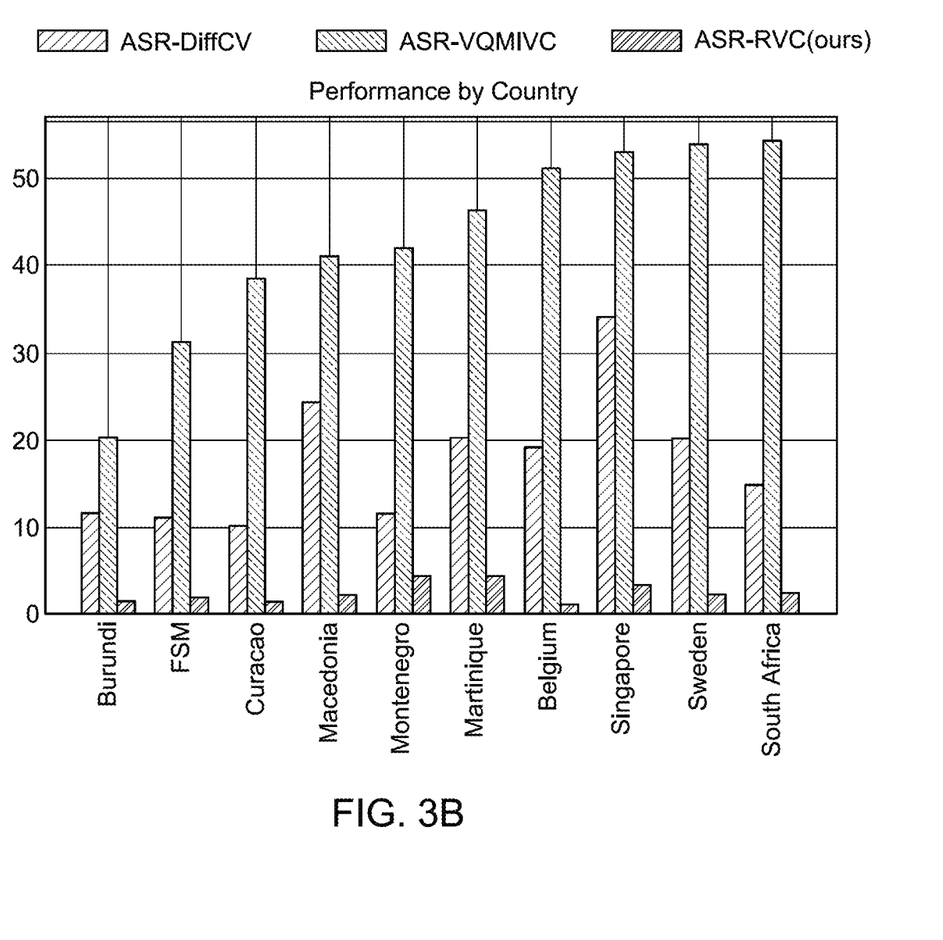
FIG. 3B is a chart for a comparative analysis of the automatic speech recognition (ASR) performance by country.

In one example comparison, the ASR-RVC model is compared with the VQMIVC model and the DiffCV model utilizing the ASR engine xLarge. The method and system of the present disclosure dramatically reduces the Word Error Rate, achieving a WER of 0.0678% compared to 4.205% for VQMIVC and 1.356% for DiffCV, indicating a substantial improvement in accuracy and achieving a CER of 8.8% compared to 64.6% and 27.8%, respectively. To further illustrate the ASR-RVC model's superior performance, comparisons in FIGS. 3A, 3B are shown against the top 10 countries and accents, respectively, where the weakest model ASR-VQMIVC model performs best Tables 2 to 15 contain information of the performance of various ASR engine models across different accents and countries, showing the Word Error Rate (WER) before and after voice conversion, and the percentage difference.

TABLE 2

WER reduction based on accent.

| Models | Min % | Max % | Avg % |
|---|---|---|---|
| Tiny | −0.4 | −55.1 | −7.3 |
| Base | −0.6 | −24.6 | −5.3 |
| Small | −0.1 | −36.2 | −4.3 |
| Medium | −0.1 | −18.1 | −2.4 |
| Large | −0.2 | −59.4 | −7.9 |
| xLarge | −0.1 | −59.4 | −6.4 |

TABLE 3

WER redution based on country.

| Models | Min % | Max % | Avg % |
|---|---|---|---|
| Tiny | −0.2 | −30.5 | −4.0 |
| Base | −0.5 | −15.4 | −3.6 |
| Small | −0.2 | −26.8 | −4.8 |
| Medium | −0.1 | −23.9 | −2.8 |
| Large | −0.1 | −59.4 | −5.3 |
| xLarge | −0.1 | −72.5 | −9.4 |

TABLE 4

Top 20 accent WER reduction using ASR engine Tiny model.

| Accent | Direct | Converted | Diff |
|---|---|---|---|
| Agni | 97.1 | 42 | −55.1 |
| Edo | 82.6 | 47.8 | −34.8 |
| Sundanese | 85.5 | 50.7 | −34.8 |
| Nepali | 62.2 | 28 | −34.2 |

TABLE 4-continued

Top 20 accent WER reduction using ASR engine Tiny model.

| Accent | Direct | Converted | Diff |
|---|---|---|---|
| Sinhala | 87 | 72.5 | −14.5 |
| Ife | 29 | 18.8 | −10.1 |
| Nandi | 36.2 | 27.5 | −8.7 |
| Filipino | 15.2 | 8 | −7.2 |
| Lao | 77.3 | 70.5 | −6.8 |
| Lamaholot | 10.1 | 4.3 | −5.8 |
| Bambara | 34.2 | 28.7 | −5.5 |
| Kru | 14.5 | 10.1 | −4.3 |
| Moore | 18.8 | 14.5 | −4.3 |
| Teochew | 20.3 | 15.9 | −4.3 |
| Khmer | 38.3 | 35.2 | −3.1 |
| Hainanese | 18.8 | 15.9 | −2.9 |
| Tibetan | 39.1 | 36.7 | −2.4 |
| Maltese | 15.2 | 13 | −2.2 |
| Ngemba | 25.4 | 23.2 | −2.2 |
| Chaldean | 15.9 | 14.5 | −1.4 |

TABLE 5

Top 20 accent WER reduction using ASR engine Base Model.

| Accent | Direct | Converted | Diff |
|---|---|---|---|
| Hadiyya | 55.1 | 30.4 | −24.6 |
| Uyghur | 66.2 | 45.4 | −20.8 |
| Hindi | 23.8 | 8.8 | −15.0 |
| Fanti | 67.1 | 52.7 | −14.5 |
| Amharic | 39.1 | 28.8 | −10.4 |
| Ebira | 46.4 | 37.7 | −8.7 |
| Croatian | 15.9 | 7.4 | −8.5 |
| Jola | 53.6 | 46.4 | −7.2 |
| Kiswahili | 21.9 | 15.1 | −6.8 |
| Satawalese | 12.3 | 5.8 | −6.5 |
| Taiwanese | 47.5 | 41.5 | −6.0 |
| Bamun | 23.2 | 17.4 | −5.8 |
| Yakut | 11.6 | 5.8 | −5.8 |
| Tajiki | 10.1 | 5.3 | −4.8 |
| Baga | 46.4 | 42.0 | −4.3 |
| Ashanti | 23.2 | 18.8 | −4.3 |
| Sesotho | 21.7 | 17.4 | −4.3 |
| Taishan | 10.1 | 5.8 | −4.3 |
| Tatar | 4.3 | 0.0 | −4.3 |
| Yupik | 7.2 | 2.9 | −4.3 |

TABLE 6

Top 20 accent WER reduction using ASR engine Small Model.

| Accent | Direct | Converted | Diff |
|---|---|---|---|
| Jola | 79.7 | 43.5 | −36.2 |
| Sylheti | 87.0 | 63.8 | −23.2 |
| Bavarian | 41.3 | 21.7 | −19.6 |
| Slovak | 17.4 | 4.3 | −13.0 |
| Wolof | 25.6 | 16.2 | −9.4 |
| Dari | 33.9 | 25.8 | −8.1 |
| Hausa | 16.4 | 10.6 | −5.8 |
| Somali | 27.5 | 21.7 | −5.8 |
| Gedeo | 11.6 | 5.8 | −5.8 |
| Kannada | 11.6 | 5.8 | −5.8 |
| Tigrigna | 24.6 | 19.4 | −5.3 |
| Kurdish | 31.2 | 26.1 | −5.1 |
| Greek | 14.3 | 9.3 | −5.0 |
| Bamun | 17.4 | 13.0 | −4.3 |
| Hainanese | 11.6 | 7.2 | −4.3 |
| Kabyle | 8.7 | 4.3 | −4.3 |
| Lamaholot | 7.2 | 2.9 | −4.3 |
| Taishan | 7.2 | 2.9 | −4.3 |
| Tatar | 4.3 | 0.0 | −4.3 |
| Arabic | 22.7 | 18.9 | −3.9 |

TABLE 7

Top 20 accent WER reduction using ASR engine Medium Model.

| Accent | Direct | Converted | Diff |
| --- | --- | --- | --- |
| Xiang | 26.8 | 8.7 | −18.1 |
| Lithuanian | 16.7 | 6.8 | −9.9 |
| Lao | 47.3 | 41.5 | −5.8 |
| Faroese | 10.1 | 4.3 | −5.8 |
| Konkani | 7.2 | 1.4 | −5.8 |
| Taiwanese | 41.7 | 36.2 | −5.4 |
| Mandarin | 19.4 | 15.4 | −4.0 |
| Gujarati | 13.7 | 10.6 | −3.1 |
| Amazigh | 26.1 | 23.2 | −2.9 |
| Burmese | 18.8 | 15.9 | −2.9 |
| Sinhala | 65.2 | 62.3 | −2.9 |
| Ilonggo | 11.6 | 8.7 | −2.9 |
| Kabyle | 7.2 | 4.3 | −2.9 |
| Tajiki | 7.2 | 4.8 | −2.4 |
| Polish | 7.8 | 5.5 | −2.3 |
| Satawalese | 9.4 | 7.2 | −2.2 |
| Greek | 10.8 | 8.8 | −2.0 |
| Ukrainian | 10.5 | 8.7 | −1.8 |
| Romanian | 8.0 | 6.3 | −1.7 |
| Korean | 16.8 | 15.3 | −1.5 |

TABLE 8

Top 20 accent WER reduction using ASR engine Large V1.

| Accent | Direct | Converted | Diff |
| --- | --- | --- | --- |
| Chichewa | 79.7 | 20.3 | −59.4 |
| Bafang | 79.7 | 36.2 | −43.5 |
| Basque | 75.4 | 43.5 | −31.9 |
| Sylheti | 87.0 | 58.0 | −29.0 |
| Kikongo | 58.7 | 33.3 | −25.4 |
| Bai | 81.2 | 65.2 | −15.9 |
| Xiang | 40.6 | 26.4 | −14.1 |
| Mandarin | 30.6 | 17.2 | −13.4 |
| Kirghiz | 36.2 | 26.1 | −10.1 |
| Somali | 35.3 | 25.6 | −9.7 |
| Czech | 13.5 | 5.6 | −7.9 |
| Khmer | 31.7 | 24.4 | −7.2 |
| Amazigh | 31.2 | 24.6 | −6.5 |
| Ukrainian | 15.5 | 9.6 | −5.9 |
| Cantonese | 17.1 | 11.3 | −5.8 |
| Hausa | 13.5 | 8.2 | −5.3 |
| Taiwanese | 41.1 | 36.2 | −4.9 |
| Teochew | 10.1 | 5.8 | −4.3 |
| Mongolian | 19.6 | 15.5 | −4.2 |
| Tigrigna | 22.6 | 18.5 | −4.2 |

TABLE 9

Top 20 accent WER reduction using ASR engine xLarge.

| Accent | Direct | Converted | Diff |
| --- | --- | --- | --- |
| Chichewa | 79.7 | 20.3 | −59.4 |
| Jola | 79.7 | 39.1 | −40.6 |
| Mauritian | 39.9 | 3.6 | −36.2 |
| Hadiyya | 51.4 | 15.9 | −35.5 |
| Burmese | 42.0 | 12.3 | −29.7 |
| Malagasy | 84.1 | 58.0 | −26.1 |
| Ilonggo | 33.3 | 10.1 | −23.2 |
| Igbo | 39.6 | 18.4 | −21.3 |
| Malayalam | 20.7 | 0.7 | −19.9 |
| Bambara | 38.8 | 26.1 | −12.8 |
| Kurdish | 42.2 | 29.6 | −12.6 |
| Taiwanese | 46.7 | 34.4 | −12.3 |
| Tibetan | 45.4 | 33.3 | −12.1 |
| Ukrainian | 19.5 | 8.7 | −10.8 |
| Tigrigna | 27.4 | 16.8 | −10.5 |
| Mandarin | 25.5 | 15.4 | −10.1 |
| Japanese | 17.4 | 7.8 | −9.6 |

TABLE 9-continued

Top 20 accent WER reduction using ASR engine xLarge.

| Accent | Direct | Converted | Diff |
| --- | --- | --- | --- |
| Lithuanian | 14.5 | 5.1 | −9.4 |
| Croatian | 12.0 | 2.9 | −9.1 |
| Bosnian | 13.5 | 4.7 | −8.9 |

TABLE 10

Top 20 Country WER reduction using ASR engine Tiny model.

| Accent | Direct | Con | Diff |
| --- | --- | --- | --- |
| Nepal | 61.7 | 31.2 | −30.5 |
| Ivory Coast | 55.6 | 36.2 | −19.3 |
| Colombia | 32.9 | 21.4 | −11.5 |
| Isle Of Man | 8.7 | 2.9 | −5.8 |
| Bahrain | 7.2 | 1.4 | −5.8 |
| Cambodia | 43.7 | 38.2 | −5.6 |
| Trinidad | 10.1 | 5.8 | −4.3 |
| Togo | 44.2 | 39.9 | −4.3 |
| Slovak Republic | 10.6 | 6.3 | −4.3 |
| Liberia | 25.1 | 21.3 | −3.9 |
| Ecuador | 36.2 | 33.3 | −2.9 |
| The Bahamas | 23.2 | 20.3 | −2.9 |
| Niger | 7.2 | 4.3 | −2.9 |
| Virgin Islands | 17.4 | 14.5 | −2.9 |
| Dominican | 27.4 | 24.8 | −2.5 |
| Indonesia | 22.6 | 20.4 | −2.2 |
| Malta | 15.2 | 13 | −2.2 |
| Libya | 39.1 | 37 | −2.2 |
| Laos | 49.6 | 47.5 | −2 |
| Sri Lanka | 36.2 | 34.3 | −1.9 |

TABLE 11

Top 20 Country WER reduction using ASR engine Base Model.

| Country | Direct | Conv | Diff |
| --- | --- | --- | --- |
| Croatia | 23.5 | 8.1 | −15.4 |
| Tanzania | 27.8 | 17.6 | −10.1 |
| UAE | 25.7 | 15.8 | −10 |
| Ethiopia | 32.4 | 25.5 | −7 |
| Bosnia | 34.8 | 30.4 | −4.3 |
| Niger | 8.7 | 4.3 | −4.3 |
| Lesotho | 21.7 | 17.4 | −4.3 |
| Somalia | 34.1 | 30 | −4.1 |
| Slovak | 8.7 | 4.8 | −3.9 |
| Belarus | 19.8 | 15.9 | −3.9 |
| Libya | 39.1 | 35.5 | −3.6 |
| India | 17.3 | 13.9 | −3.4 |
| Tajikistan | 15.6 | 12.3 | −3.3 |
| Nepal | 28.7 | 25.7 | −3 |
| Togo | 38.4 | 35.5 | −2.9 |
| Cyprus | 38.4 | 36.2 | −2.2 |
| Curacao | 3.6 | 1.4 | −2.2 |
| Bolivia | 21.4 | 19.8 | −1.5 |
| Faroe Islands | 13 | 11.6 | −1.4 |
| Haiti | 4.3 | 2.9 | −1.4 |

TABLE 12

Top 20 Country WER reduction using ASR engine Small Model.

| Country | Direct | Conv | Diff |
| --- | --- | --- | --- |
| Libya | 57.2 | 30.4 | −26.8 |
| Slovak Republic | 27.1 | 2.9 | −24.2 |
| Jordan | 57 | 34.3 | −22.7 |
| Cyprus | 51.4 | 29.7 | −21.7 |
| Qatar | 53.6 | 33.3 | −20.3 |

TABLE 12-continued

Top 20 Country WER reduction using ASR engine Small Model.

| Country | Direct | Conv | Diff |
|---|---|---|---|
| Portugal | 23.2 | 8.7 | −14.5 |
| Eritrea | 28.7 | 20 | −8.7 |
| Egypt | 25.1 | 18.8 | −6.3 |
| Somalia | 27.5 | 21.7 | −5.8 |
| Israel | 13.3 | 7.9 | −5.4 |
| Singapore | 8.7 | 3.6 | −5.1 |
| Iraq | 28.3 | 23.8 | −4.4 |
| Martinique | 10.1 | 5.8 | −4.3 |
| Sri Lanka | 30.9 | 26.6 | −4.3 |
| Bolivia | 18.6 | 14.4 | −4.2 |
| Algeria | 6.5 | 2.5 | −4 |
| Colombia | 15.3 | 11.7 | −3.6 |
| Saudi Arabia | 24.4 | 20.9 | −3.4 |
| Nicaragua | 44 | 40.8 | −3.2 |
| Senegal | 27.8 | 24.8 | −3 |

TABLE 13

Top 20 Country WER reduction using ASR engine Medium Model.

| Country | Direct | Conv | Diff |
|---|---|---|---|
| Cyprus | 57.2 | 33.3 | −23.9 |
| Lithuania | 14.7 | 7.7 | −7 |
| Venezuela | 17.7 | 11.1 | −6.6 |
| Egypt | 24.2 | 17.6 | −6.5 |
| Martinique | 11.6 | 5.8 | −5.8 |
| Faroe Islands | 10.1 | 4.3 | −5.8 |
| Tunisia | 29 | 24.2 | −4.8 |
| Yemen | 10.1 | 5.8 | −4.3 |
| Morocco | 15.4 | 11.5 | −4 |
| Taiwan | 29.5 | 25.9 | −3.6 |
| Romania | 7.8 | 4.3 | −3.4 |
| Montenegro | 7.2 | 4.3 | −2.9 |
| China | 19.4 | 16.6 | −2.8 |
| Poland | 7.8 | 5.5 | −2.3 |
| Ecuador | 29.7 | 27.5 | −2.2 |
| Qatar | 30.4 | 28.5 | −1.9 |
| Algeria | 5.1 | 3.3 | −1.8 |
| South Korea | 17.2 | 15.5 | −1.7 |
| Oman | 5.8 | 4.3 | −1.4 |
| Madagascar | 55.1 | 53.6 | −1.4 |

TABLE 14

Top 20 Country WER reduction using ASR engine Large V1.

| Country | Direct | Conv | Diff |
|---|---|---|---|
| Malawi | 79.7 | 20.3 | −59.4 |
| Qatar | 49.8 | 30.4 | −19.3 |
| Chile | 24.6 | 6.2 | −18.4 |
| Cameroon | 34.5 | 17.9 | −16.6 |
| Ivory Coast | 36.2 | 20.8 | −15.5 |
| Taiwan | 38 | 25.4 | −12.6 |
| Angola | 31.3 | 19.7 | −11.6 |
| Jordan | 39.1 | 29.5 | −9.7 |
| Somalia | 35.3 | 25.6 | −9.7 |
| Cambodia | 36.2 | 27.3 | −8.9 |
| Puerto Rico | 22.5 | 14.5 | −8 |
| Czech Republic | 13.5 | 5.6 | −7.9 |
| DR of Congo | 31.6 | 23.8 | −7.8 |
| USA | 13.8 | 6.4 | −7.3 |
| Eritrea | 26.8 | 20 | −6.8 |
| China | 27.3 | 20.8 | −6.5 |
| Kyrgyzstan | 20.3 | 13.8 | −6.5 |
| Mongolia | 27.5 | 21.5 | −6 |
| Martinique | 10.1 | 4.3 | −5.8 |
| Morocco | 16.9 | 11.2 | −5.7 |

TABLE 15

Top 20 Country WER reduction using ASR engine xLarge.

| Country | Direct | ConV | Diff |
|---|---|---|---|
| Guatemala | 79.7 | 7.2 | −72.5 |
| Malawi | 79.7 | 20.3 | −59.4 |
| Cyprus | 81.2 | 31.2 | −50 |
| Ivory Coast | 59.4 | 21.3 | −38.2 |
| Mauritius | 39.9 | 3.6 | −36.2 |
| Libya | 57.2 | 29 | −28.3 |
| Jordan | 54.6 | 28 | −26.6 |
| Madagascar | 84.1 | 58 | −26.1 |
| Qatar | 49.8 | 30 | −19.8 |
| Egypt | 32.1 | 16.2 | −15.9 |
| Tunisia | 39.6 | 23.7 | −15.9 |
| Mali | 28.6 | 12.7 | −15.9 |
| Armenia | 25.7 | 11.2 | −14.5 |
| Eritrea | 33.6 | 19.3 | −14.3 |
| Jamaica | 21.4 | 7.8 | −13.6 |
| Angola | 32.5 | 19.1 | −13.3 |
| Croatia | 16.8 | 3.5 | −13.3 |
| Myanmar | 27.9 | 15.6 | −12.3 |
| Ukraine | 18.1 | 7.4 | −10.7 |
| Mongolia | 31.4 | 20.8 | −10.6 |

The comparisons shown in Tables 2 to 15 clearly indicate that the ASR-RVC method and system of the present disclosure significantly reduces the word error rate across these challenging linguistic scenarios. The ASR-RVC identified a range of effectiveness in the application to speakers of the native language. Specifically, for English, it was found that speakers of Germanic languages exhibited little to no improvement in recognition accuracy. This suggests that the method and system of the present disclosure approach may have varying levels of effectiveness depending on the linguistic proximity to the target language. Furthermore, in an attempt to evaluate the generalization of the method and system of the present disclosure across multiple languages, the experiments are extended to include the Arabic language. Participants from various West Asian nationalities, including India, Pakistan, Sri Lanka, and Bangladesh, were involved in these experiments. Significant improvements were found at the Word Error Rate (WER) and the method achieved unexpected reductions in the Character Error Rate (CER) with the ASR engine Tiny and Small ASR engine models, showing decreases of 23% and 33%, respectively.

The ASR-RVC method and system of the present disclosure is particularly adept at recognizing challenging guttural sounds which are commonly misidentified by ASR models. Guttural sounds are a hoarse sound made in the back of the throat. The Latin word guttur, "throat or gullet," is the root of guttural. This underscores the potential of voice conversion technology to enhance the performance of ASR systems, especially for models with smaller architectures.

The results confirm that voice conversion can substantially mitigate accent bias in Automatic Speech Recognition (ASR) systems, as evidenced by the significant reduction in Word Error Rates (WER) across all tested models. The ASR engine xLarge model, in particular, has proven to be exceptionally effective, indicating that more advanced models with larger capacities are better suited to handle the phonetic and prosodic variations of non-native English speech.

In disclosed embodiments, hyperparameters may be adjusted for particular real-world applications, to refine how ASR systems are developed to serve a multilingual and multicultural user base. Examples in the form of real-world applications of the method and system of the present disclosure are highlighted.

Smart speakers such as Amazon Echo, Google Nest, Apple HomePod, and Sonos Era rely on a service for automatic speech recognition. For example, the Alexa Service performs common Speech Language Understanding (SLU) processing on behalf of an Alexa Skill, including Automated Speech Recognition (ASR), Natural Language Understanding (NLU), and Text to Speech (TTS) conversion.

Each of these devices and speech services can be enhanced by the ASR-RVC of the method and system of the present disclosure. Speech services like Alexa are gradually being expanded to give an option to recognize a language other than English. However, in each case, the automatic speech recognition engine performs best when the speech is by a person of the native language. Speech by non-native speakers suffers from high error rates. The RVC component can be used as a plug-in to seamlessly accommodate non-native language speakers for accurate automatic speech recognition.

An embodiment is a computer readable storage medium storing a computer program for the RVC component. The computer program is configured to run on graphic processing units (GPU). An example implementation is a program for the NVIDIA RTX 3090 GPU. The speech waveform that is output from the RVC component is an input to an ASR engine. In another embodiment, the computer program is run on a conventional central processing unit (CPU).

Figure 4:
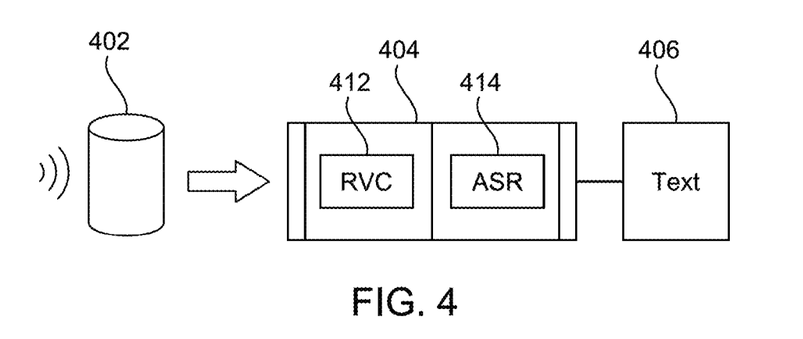
FIG. 4 is a block diagram of a smart speaker system including the RVC-ASR engine.
Figure 5:
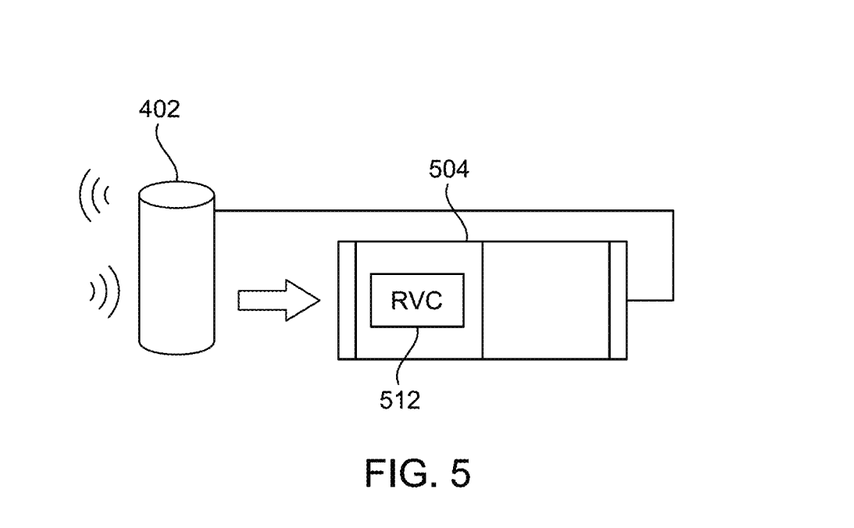
FIG. 5 is a block diagram of a smart speaker configured to language learning using the RVC component.

FIG. 4 is a smart speaker that is enhanced with the ASR-RVC of FIG. 1A, 1B. The smart speaker system includes a smart speaker device 402 for receiving speech in a language, starting with a wake word. The smart speaker device or other speech enabled device 402 includes Amazon Alexa, Google Assistance, Apple Siri, or equivalent thereof. The smart speaker device 402 or speech enabled device relies on a speech service 404. The speech service includes the RVC component 412 and the ASR engine 414 and output text 406 of the input speech in a native language.

The method and system of the present disclosure accomplishes accent normalization. The disclosed RVC component transforms non-native speech into a native equivalent. This transformation helps to minimize accent-induced transcription errors. For example, the RVC transforms speech for non-native English speech in Western Asia into a native equivalent for English language.

The method and system of the present disclosure ensures phonetic consistency. The method and system of the present disclosure utilizes a phoneme encoder to ensure the linguistic content is maintained while altering the acoustic properties to match native pronunciation.

The method and system of the present disclosure can be applied to language learning. The method and system of the present disclosure can assist language learners in improving their pronunciation by providing speech feedback based on native speech patterns. FIG. 4 is a smart speaker of speech enabled device where the output speech is a speech signal in accordance with a native speaking person. A person that speaks as a non-native speaker of a language can hear their own input speech as though it is spoken by a native language speaker. This approach can assist the non-native speaker in learning to improve their speech of the native language. This arrangement includes a smart speaker device or other speech enabled device 402 that provides a speech pattern to an RVC component 412. The output waveform from the RVC component 412 is fed back to the smart speaker 402 to output the speech in accordance with a native language speech.

Figure 6:
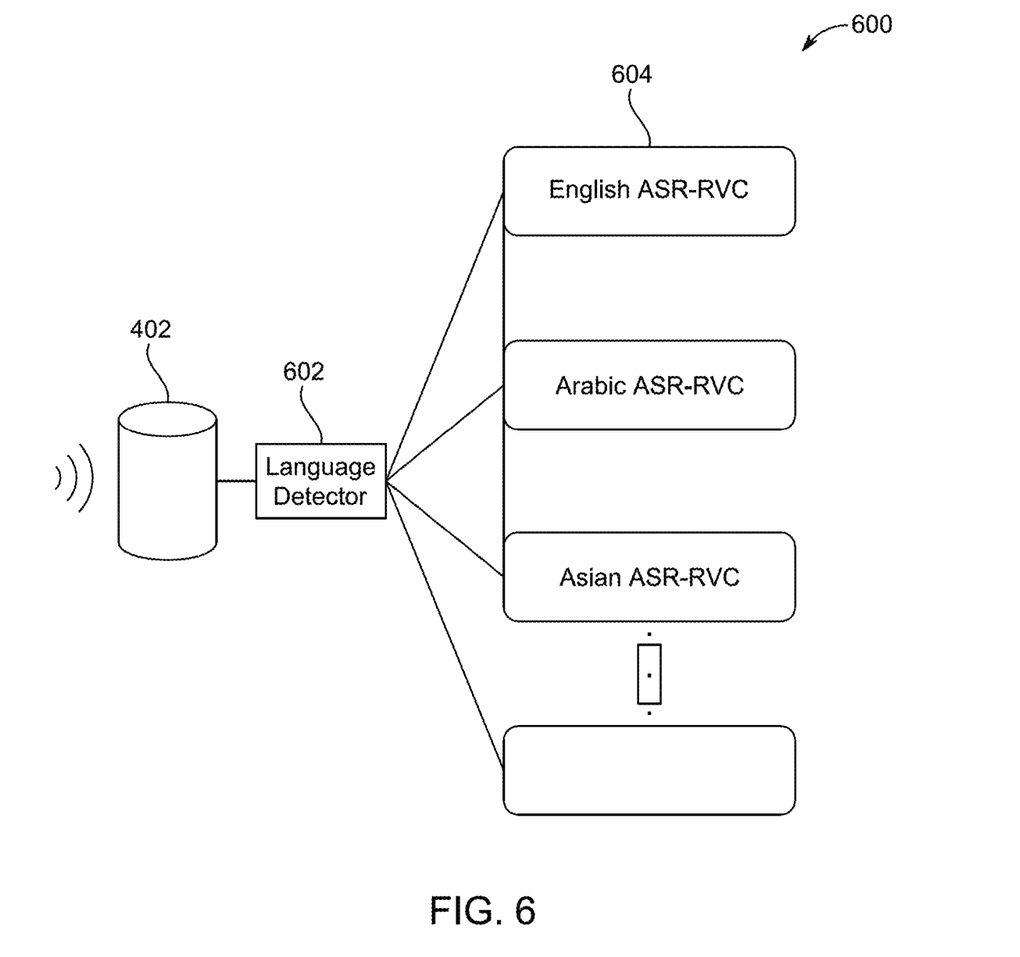
FIG. 6 is a block diagram of a smart speaker that can handle multiple languages.

The method and system of the present disclosure can include a language detection component. An embodiment of the method and system of the present disclosure includes automatic detector of the language of the input speech, allowing the system to select an appropriate voice conversion model for that language. FIG. 20 is a diagram of a speech recognition system for multiple languages. The speech recognition system 2000 can use the smart speaker device or other speech enabled device 402 for receiving speech. A language detector 2002 is configured to detect the language of the speech being received. Once a language is detected, an appropriate RVC-ASR engine 2004 can be used for recognition of the input speech by a person that is a non-native language speaker.

The method and system of the present disclosure employs vector-based speech representation. The vector representations of speech facilitate the efficient identification of similar phonetic patterns between non-native and native speech.

The method and system of the present disclosure includes adaptive voice conversion. The disclosed method can adaptively train a Mel-spectrogram generative model on native speech, to generate a converted voice that is closely aligned with native pronunciation and intonation.

The RVC component of the method and system of the present disclosure can be seamlessly connected with existing ASR engines. The disclosed RVC interfaces seamlessly with existing ASR engines, improving their accuracy in recognizing speech of non-Native speakers by providing the engines with native-equivalent speech.

The method and system of the present disclosure is scalable. Embodiments of the method and system of the present disclosure are extended to multiple languages through creation of separate vector databases and generative models for each language.

The method and system of the present disclosure improves ASR Accuracy. By providing ASR systems with native-like speech, the method and system of the present disclosure reduce transcription errors and improve the overall accuracy of speech recognition.

The method and system of the present disclosure is useful for multinational corporations. The method and system of the present disclosure provide more accurate voice-to-text solutions for employees in multinational corporations who may not be native speakers of the company's primary language.

The method and system of the present disclosure can improve customer service bots. The method and system of the present disclosure can improve the understanding of customer queries in voice-controlled customer service bots, ensuring that non-native accents do not hinder service delivery.

The method and system of the present disclosure can improve healthcare communication. The method and system of the present disclosure can assist in transcribing patient information and doctor's instructions where non-native speakers are involved, improving communication in healthcare settings.

The method and system of the present disclosure can improve legal and law enforcement. The method and system of the present disclosure can provide more reliable transcriptions of interviews and testimonies where the speakers may have diverse linguistic backgrounds.

The method and system of the present disclosure can improve media subtitling and dubbing. The method and system of the present disclosure can aid in creating accurate subtitles and dubbings for media content by converting non-native speech for better recognition and transcription.

The method and system of the present disclosure can enhance educational resources. The method and system of the present disclosure can enhance the accessibility of educational content by ensuring accurate transcriptions of lectures and materials from non-native speakers.

The method and system of the present disclosure can help facilitate speech data collection and analysis. The method and system of the present disclosure can facilitate the collection and analysis of speech data in linguistics and AI research, where accurate transcriptions of diverse accents are crucial.

Next, further details of the hardware description of an exemplary computing environment for performing the program instructions according to embodiments is described with reference to FIGS. 1A-B, 2A-B and 4-7.

Figure 7:
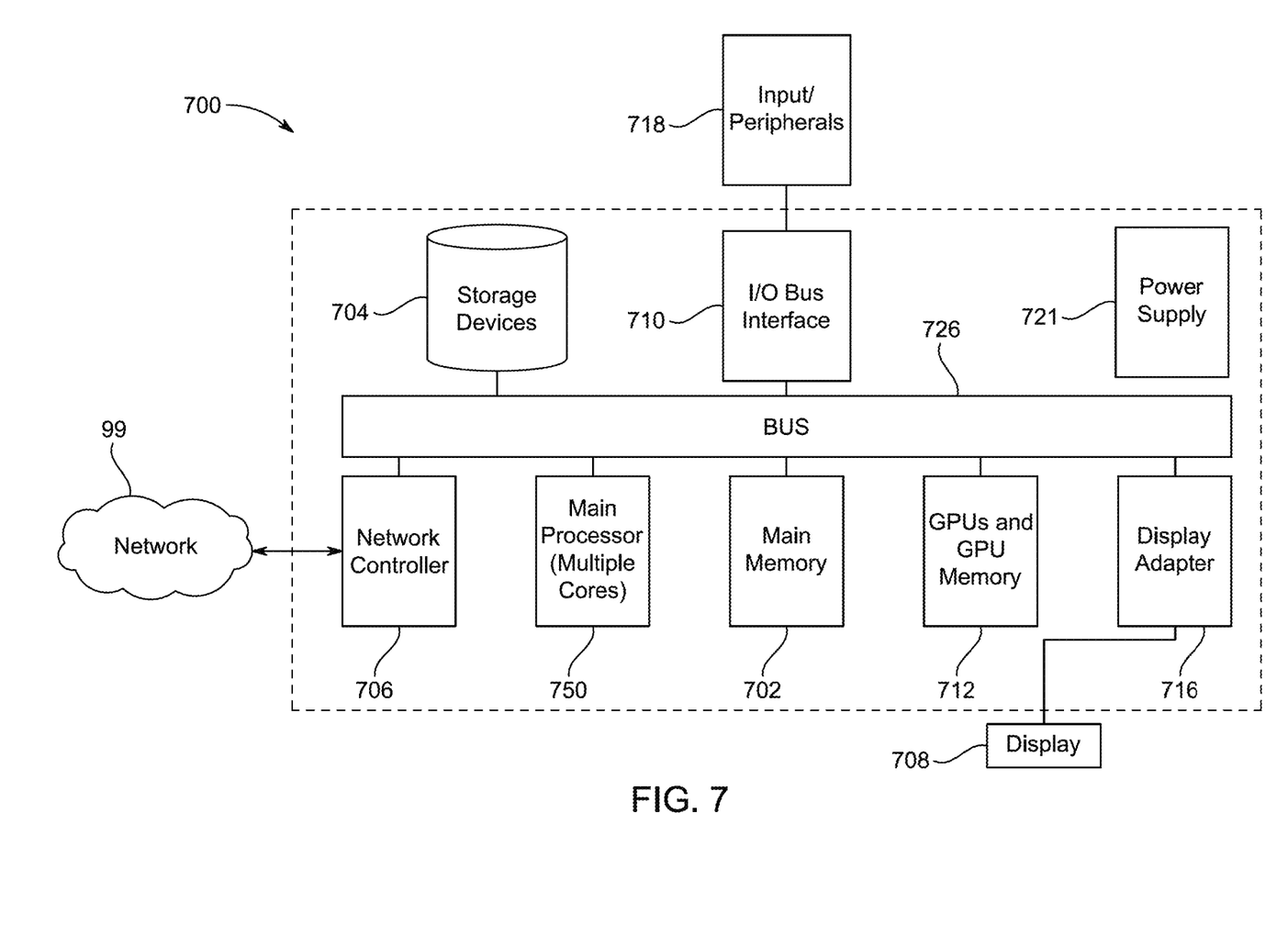
FIG. 7 is a block diagram of a computer system for the RVC-ASR engine.

FIG. 7 is a block diagram illustrating an example computer system for implementing the machine learning training and inference methods according to an exemplary aspect of the disclosure. The computer system may be an AI workstation running an operating system, for example Ubuntu Linux OS, Windows, a version of Unix OS, or Mac OS. The computer system 700 may include one or more central processing units (CPU) 750 having multiple cores. The computer system 700 may include a graphics board 712 having multiple GPUs, each GPU having GPU memory. The graphics board 712 may perform many of the mathematical operations of the disclosed machine learning methods. The computer system 700 includes main memory 702, typically random access memory RAM, which contains the software being executed by the processing cores 750 and GPUs 712, as well as a non-volatile storage device 704 for storing data and the software programs. Several interfaces for interacting with the computer system 700 may be provided, including an I/O Bus Interface 710, Input/Peripherals 718 such as a keyboard, touch pad, mouse, Display Adapter 716 and one or more Displays 708, and a Network Controller 706 to enable wired or wireless communication through a network 99. The interfaces, memory and processors may communicate over the system bus 726. The computer system 700 includes a power supply 721, which may be a redundant power supply.

In some embodiments, the computer system 700 may include a server CPU and a graphics card by NVIDIA, in which the GPUs have multiple CUDA cores. In some embodiments, the computer system 700 may include a machine learning engine 712.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Numerous modifications and variations of the present invention are possible in light of the above teachings. It is therefore to be understood that within the scope of the appended claims, the invention may be practiced otherwise than as specifically described herein.

The invention claimed is:

1. A computer-implemented method of generating speech from a source voice of a speaker in a language for a speech device connected to the computer, where the speech device language is a non-native language of the speaker, comprising:

inputting, via the speech device, speech in the source voice;

encoding, by a phoneme encoder of the computer, the speech in the source voice into a content vector;

retrieving top k similar content vectors from a vector representation database that match phonetic patterns of the encoded source voice;

generating, using a Mel-Spectrogram Generative Model of the computer, a new voice waveform based on the similar content vectors that contains linguistic content of the source voice, but with the phonetic patterns of a native speaker's voice of the speech device language; and outputting the new voice waveform.

2. The method of claim 1; further comprising:

generating, by an Automated Speech Recognition (ASR) Engine, text transcription from the outputted new voice waveform.

3. The method of claim 1, further comprising:

training the Mel-Spectrum Generative Model including:

gathering a collection of voice samples, in a form of audio waveforms, from native speakers of a target native language;

extracting, by the phoneme encoder, phonetic components from the audio waveforms, and converting the phonetic components into a series of content vectors;

storing the content vectors in the vector representation database, which is specifically tailored for the target native language;

training the Mel-Spectrogram Generative Model using the content vectors from the database; and storing the trained Mel-Spectrum Generative Model.

4. The method of claim 1, wherein the retrieving step includes an index search to retrieve closest matching target vectors using a similarity search algorithm.

5. The method of claim 4, wherein the retrieving step includes weighing the matching vectors to a match score and combining the weighted vectors with source audio content vectors.

6. The method of claim 5, further comprising processing the combined features through the Mel-Spectrogram Generative Model to generate the new waveform.

7. The method of claim 1, wherein the phoneme encoder maintains linguistic content while altering acoustic properties to match native language pronunciation.

8. The method of claim 1, further comprising detecting, by a language detection model, the language of the input speech in the source voice.

9. The method of claim 8, further comprising a plurality of vector databases and respective MEL-spectrum generative models for a plurality of languages, and selecting a respective vector database and MEL-Spectrum generative model for the detected language.

10. The method of claim 2, further comprising selecting an ASR engine from a plurality of stored ASR engines obtained from different vendors; and generating the text transcription using the selected ASR engine.

11. The method of claim 1, wherein the speech device outputs the generated speech based on the new voice waveform.

12. A non-transitory computer-readable storage medium including computer executable instructions, wherein the instructions, when executed by a computer, cause the computer to perform a method for generating speech from a source voice of a speaker in a language for a speech device connected to the computer, where the speech device language is a non-native language of the speaker, the method comprising:

receiving, via the speech device, speech in the source voice;

encoding, by a phoneme encoder, the speech in the source voice into a content vector;

retrieving top k similar content vectors from a vector representation database that match phonetic patterns of the encoded source voice;

generating, using a Mel-Spectrogram Generative Model, a new voice waveform based on the similar content vectors that contains linguistic content of the source voice, but with the phonetic patterns of a native speaker's voice of the speech device language; and outputting the new voice waveform.

13. The non-transitory computer-readable storage medium of claim 12; further comprising:

generating, by an Automated Speech Recognition (ASR) Engine, text transcription from the outputted new voice waveform.

14. The non-transitory computer-readable storage medium of claim 12, further comprising:

training the Mel-Spectrum Generative Model including:

gathering a collection of voice samples, in a form of audio waveforms, from native speakers of a target native language;

extracting, by the phoneme encoder, phonetic components from the audio waveforms, and converting the phonetic components into a series of content vectors;

storing the content vectors in the vector representation database, which is specifically tailored for the target native language;

training the Mel-Spectrogram Generative Model using the content vectors from the database; and storing the trained Mel-Spectrum Generative Model.

15. The non-transitory computer-readable storage medium of claim 12, wherein the retrieving step is an index search to retrieve closest matching target vectors using a similarity search algorithm.

16. The non-transitory computer-readable storage medium of claim 5, wherein the retrieving step includes weighing the matching vectors to a match score and combining the weighted vectors with source audio content vectors.

17. The non-transitory computer-readable storage medium of claim 16, further comprising processing the combined features through the Mel-Spectrogram Generative Model to generate the new waveform.

18. The non-transitory computer-readable storage medium of claim 12, wherein the phoneme encoder maintains linguistic content while altering acoustic properties to match native language pronunciation.

19. The non-transitory computer-readable storage medium of claim 12, further comprising detecting, by a language detection model, the language of the input speech in the source voice.

20. The non-transitory computer-readable storage medium of claim 19, further comprising a plurality of vector databases and respective MEL-spectrum generative models for a plurality of languages, and selecting a respective vector database and MEL-Spectrum generative model for the detected language.

* * * * *